Figure 5:
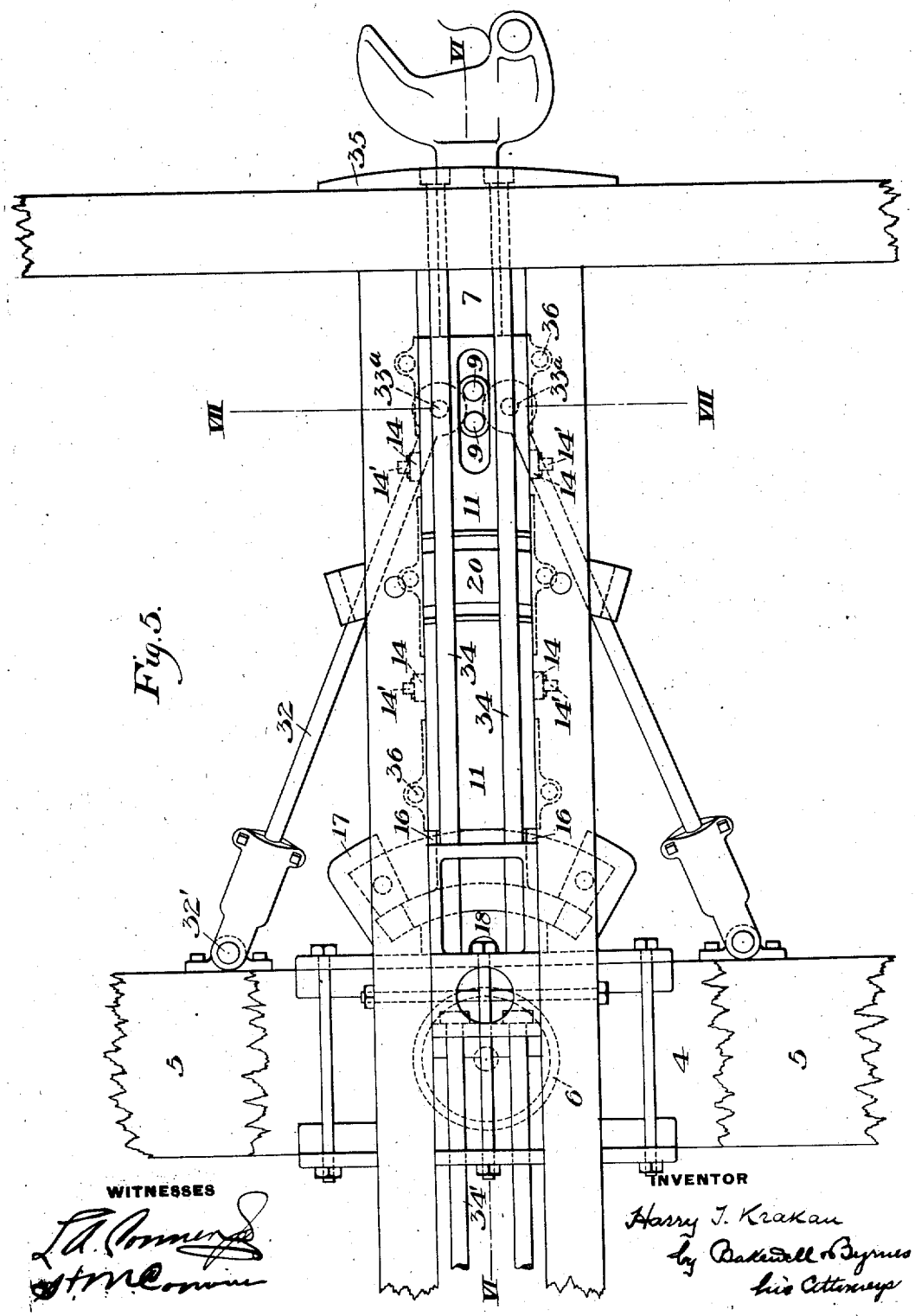

No. 12,178.
REISSUED DEC. 1, 1903
H. T. KRAKAU.
DRAFT RIGGING.
APPLICATION FILED SEPT. 22, 1903.
4 SHEETS—SHEET 1.
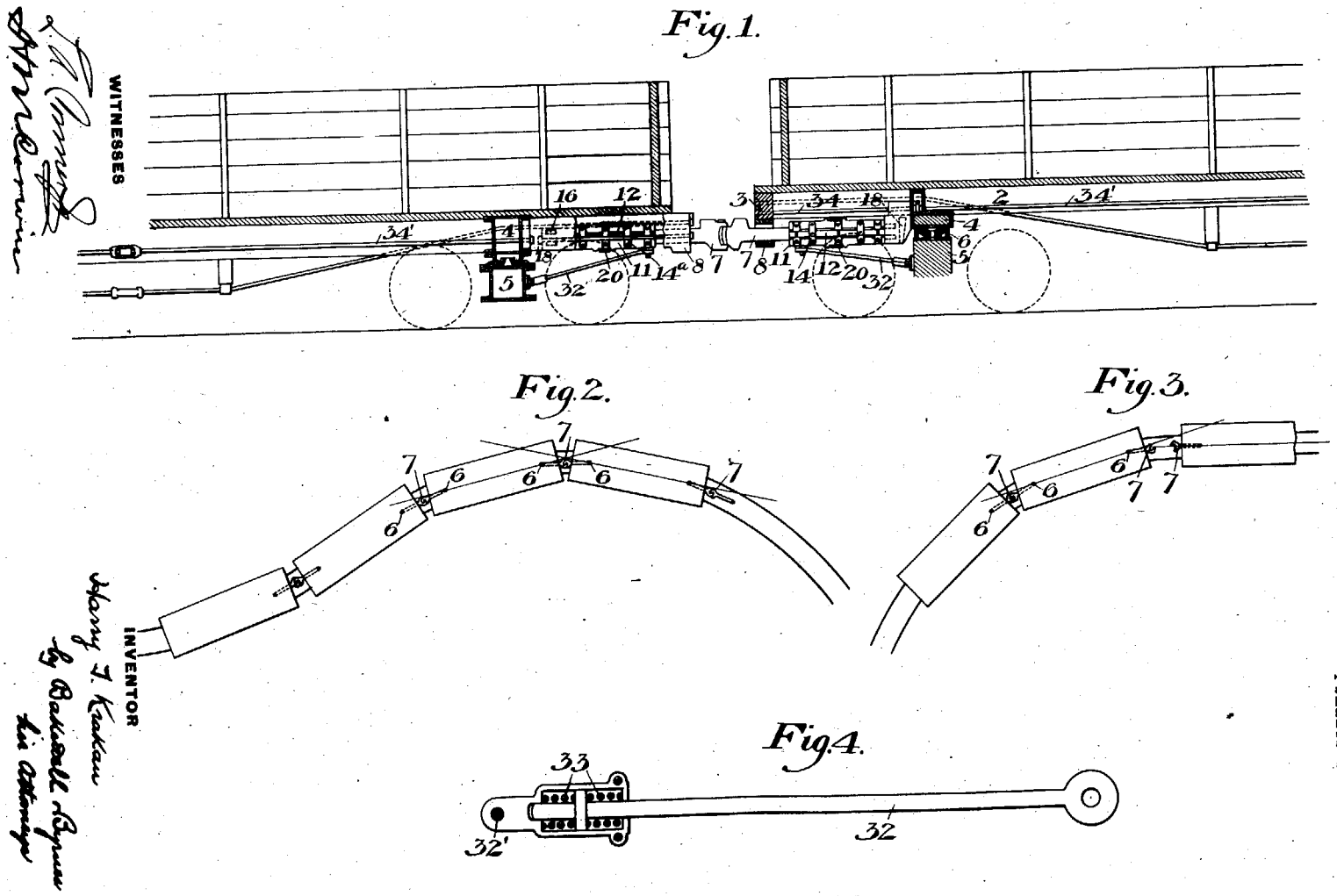
WITNESSES
L. A. Connell
H. M. Corwin
INVENTOR
Harry T. Krakau
by Bakewell & Byrne
his Attorneys No. 12,178. REISSUED DEC. 1, 1903.

H. T. KRAKAU.

DRAFT RIGGING.

APPLICATION FILED SEPT. 22, 1903.

4 SHEETS—SHEET 2.

WITNESSES

L. A. Commers

J. T. McCormick

INVENTOR

Harry T. Krakau by Bakewell & Byrnes his Attorneys

No. 12,178. REISSUED DEC. 1, 1903.
H. T. KRAKAU.
DRAFT RIGGING.
APPLICATION FILED SEPT. 22, 1903.
4 SHEETS—SHEET 3.
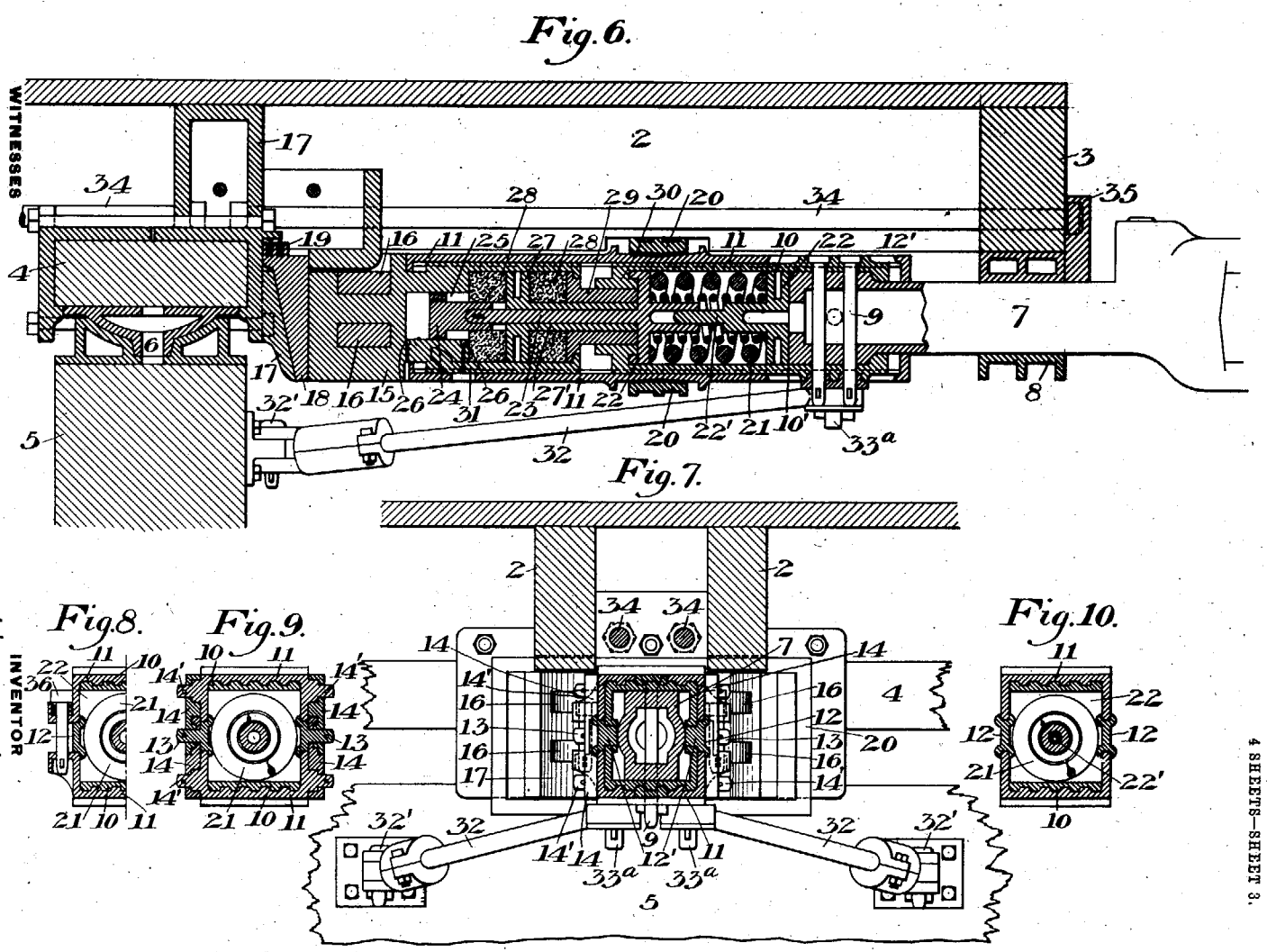
WITNESSES
L. A. Conner
H. M. Corwin
INVENTOR
Harry T. Krakau
by Bakewell & Byrne
his Attorneys No. 12,178. REISSUED DEC. 1, 1903.
H. T. KRAKAU.
DRAFT RIGGING.
APPLICATION FILED SEPT. 22, 1903.
4 SHEETS—SHEET 4.
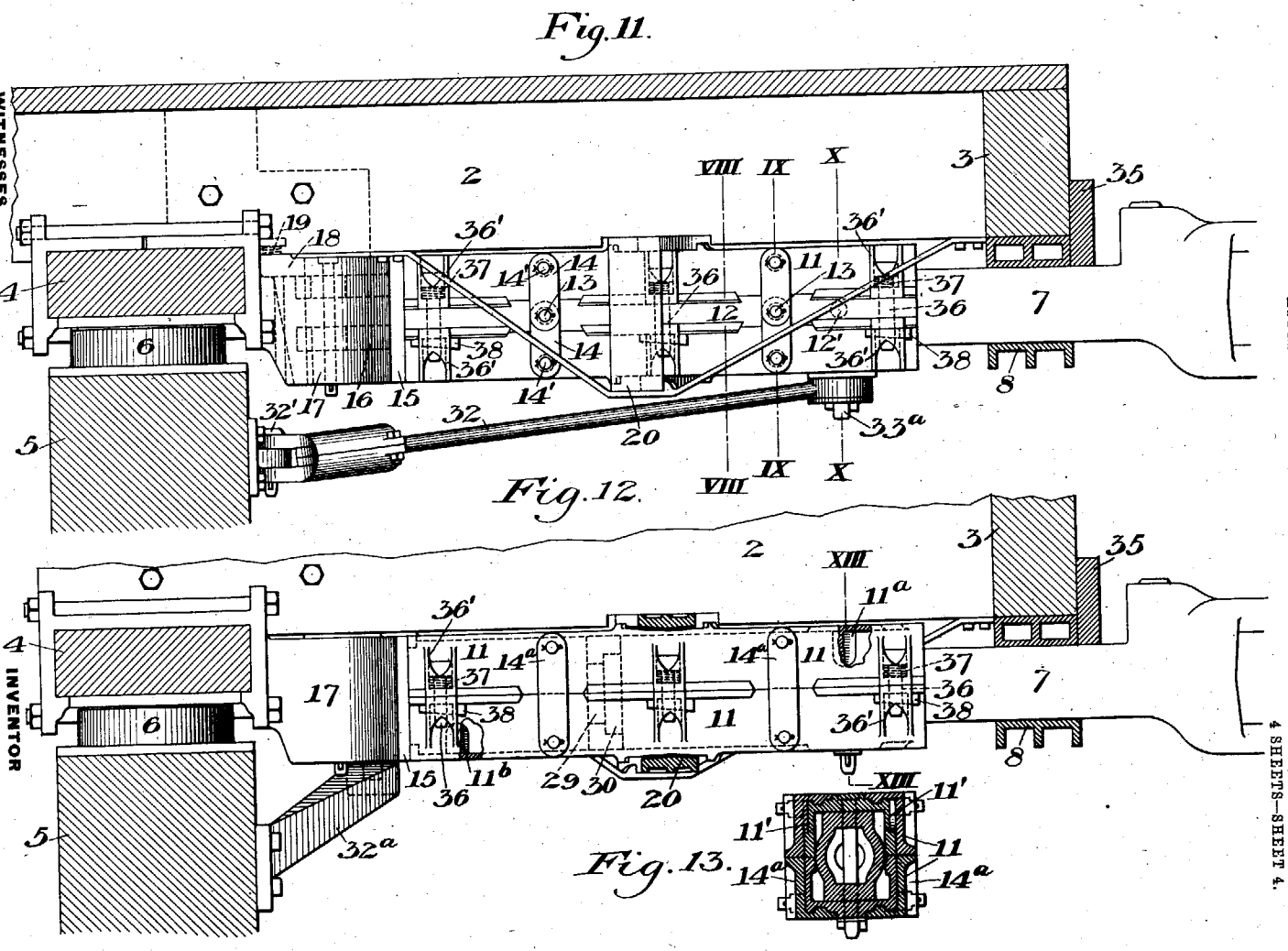
WITNESSES
L. A. Powers
H. M. Corwin
INVENTOR
Harry T. Krakau
by Bakewell & Byron
his attorneys No. 12,178. Reissued December 1, 1903.

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

DRAFT-RIGGING.

SPECIFICATION forming part of Reissued Letters Patent No. 12,178, dated December 1, 1903.

Original No. 664,278, dated December 18, 1900. Reissue No. 11,904, dated April 9, 1901. Application for present reissue filed September 22, 1903. Serial No. 174,232.

*To all whom it may concern:*

Be it known that I, HARRY T. KRAKAU, of Cleveland, Cuyahoga county, Ohio, have invented a new and useful Improvement in Draft-Riggings, of which the following is a full, clear, and exact description, reference being had to the accompanying drawings, forming part of this specification, in which—

Figure 1 shows in longitudinal section two cars coupled together and provided with my improved draft-rigging. Fig. 2 is a diagram view showing a number of cars having draft-riggings of my invention coupled and standing on a curved track. Fig. 3 is a diagram view showing two of such cars coupled and standing on a curved portion of the track, with a third car on a straight portion of the track adjacent thereto. Fig. 4 is a sectional view of one of the centering-rods 32 and its spring. Fig. 5 is a plan view on a larger scale, showing the parts of my improved draft-rigging. Fig. 6 is a vertical longitudinal section on the line VI VI of Fig. 5. Fig. 7 is a vertical cross-section on the line VII VII of Fig. 5. Figs. 8, 9, and 10 are vertical sections on the lines VIII VIII, IX IX, and X X, respectively, of Fig. 11. Fig. 11 is a side elevation of the draft-rigging. Fig. 12 is a side elevation of a modified construction, and Fig. 13 is a vertical cross-section on the line XIII XIII of Fig. 12.

The draft-riggings of railway-cars of the kind heretofore commonly used with automatic couplers of the Master Car-Builders' type have been made with draw-bars mounted substantially rigidly or capable of only slight lateral motion in their carry-irons. The consequence is that the couplers project substantially in the middle longitudinal line of the car-body. When cars so equipped are passing around a curve in the track, the trucks, being swiveled to the car-body by king-bolts and center plates, will accommodate themselves to the curvature of the rails; but the couplers themselves are held by the car-bodies and projecting as they do on the middle lines of the cars are necessarily at an angle to each other. By reason of this position of the couplers great strain is put upon them, which is transmitted to the sills and draft-timbers, thence to the body-bolster and through the center plates to the truck-bolster against the top of the columns and column-guides, thence to the axle-box through the arch-bars, and thence to the journal-brasses, axle, wheel-flanges, and rails. This strain is very destructive and often results in breaking the coupler or straining some of the other parts of the car. It also abrades the brasses and the collars of the axle, and by causing the flanges of the wheels to bear with grinding force on the heads of the rails it rapidly wears out the rails and the wheels themselves.

It is the object of my invention to prevent these evils and to provide a draft-rigging which will permit such flexibility to the parts as the cars travel on a curve as to prevent the cramping of the couplers and the straining and wear of the car thereby. I also provide means whereby the strains of draft and buffing are absorbed by the draft-rigging in a more effective manner than heretofore.

Instead of constructing the draft-rigging so that the draw-bar shall always project in the middle longitudinal line of the car I mount the draft-rigging on a curved segment bar or bars in advance of the car-bolster, which segment-bar holds the draft-rigging horizontal and adapts it to swing laterally on a center which is substantially coincident with the axis of the center plates of the truck, and I connect the same by a centering device to the truck-bolster, so that the draft-rigging will swing laterally in conformity with the position of the truck and will stand substantially at right angles to the truck when the car is disconnected and will thus keep the draw-bar automatically in position for coupling. The spring mechanism of the draft-rigging is in advance of the said segment-bars and is preferably contained between longitudinal plates or bars slidingly connected at one end, which hold the spring mechanism in place and enable it to move laterally with the draw-bar. The draw-bar itself receives and transmits the forces of buffing and draft. The draft is always on a line which connects the pivotal centers of the draft-rigging—that is, the centers on which the trucks are swiveled—Figs. 2 and 3. The cars, therefore, may pass around a curve without cramping the couplers or draft-rigging, which will remain in alinement with each other and will afford the necessary flexibility to prevent the straining and wearing of the parts of the car and the track and at the same time will transmit buffing and pulling strains to the strongest part of the car-framing.

In the drawings, 2 2 are the longitudinal sills, and 3 is the end sill, of a car to which my invention is applied, the car illustrated on Sheets 2, 3, and 4 of the drawings being an ordinary wooden car, though with suitable modifications of form the device may be applied to steel-car constructions.

4 is the body-bolster, 5 the truck-bolster, and 6 6 the center plates.

7 is the draw-bar, which is supported at the end of the car by a carry-iron 8 and is connected rigidly by pins 9 with a two-part yoke 10 10′, which extends rearwardly therefrom.

11 11 are friction-plates, which are mounted so as to be capable of sliding slightly on the yoke and extend rearwardly therefrom. They are preferably made of channel-pieces, preferably of malleable iron, and are fitted to the parts of the yoke by tongues on the one part fitting in longitudinal grooves on the other. Between the parallel edges of the friction-plates are slide-bars 12 12, which are fixed to the yoke 10′ by pins or studs 12′ and are longitudinally movable between the friction-plates 11. At intervals they are provided with pins 13, and toggle-links 14 are pivoted at their outer ends to the friction-plates 11 by pins or studs 14′, and at their inner ends they are pivoted to the pins 13. At the rear end of the draft-rigging the friction-plates 11 are slidingly connected to a head 15, (preferably a casting,) mounted so as to be laterally movable on transverse curved bearings or segment-bars 16, held at the ends by a frame or casting 17, which is secured to the body-bolster and sills. The head 15 is preferably T-shaped, and a curved bearing-wedge 18, provided with a spring 19 for forcing it downwardly into place and taking up wear, is interposed between it and the end of the casting 17. These parts 17 and 18 serve to transmit the strain from the draft-rigging to the body-bolster 4, and thus to back the draft-rigging during the buffing and relieve the curved bearings at 16. The segment-bars 16 are in advance of the bolster and are curved on a center which is coincident or nearly coincident with the axis of the center plates, so that when the draft-rigging is swung laterally on said segments it will, in effect, turn on the center just mentioned.

At the middle portion of the draft-rigging is a carry-iron 20, through which the draft-rigging has a slight longitudinal movement, and the meeting surfaces of this carry-iron and of the friction-plates 11 are inclined, so as to give a wedging action to the parts, and thus to assist in taking up the strains of pulling and buffing.

The draft-rigging is provided with suitable springs or compressing devices, preferably a spring or springs 21, interposed between two follower-plates 22, having telescopic connections 22′, which guide the parts and serve as stops, limiting the extent of the compression. The rear follower 22 has a stem 23, at the end of which is a small piston 24, fitting in an air-cushion cylinder 25, which may be provided with ball-valves 26, controlling air-ports and adapted to admit air when the air in the cylinder is rarefied by forward motion of the piston and to be shut up by compression of the air on the reverse motion.

27 is the rear follower, having a hollow stem 27′ extending to the forward follower 22.

28 28 are rubber blocks set on each side of the rear follower, and 29 is a distance-piece or thimble interposed between the front follower and the front rubber block and passing through a contracted portion or neck 30 of the yoke 10. Suitable springs, with the followers, may be substituted for the rubber blocks, and for purposes of removal I prefer to make plate 31, which connects the head 15 with the thimble 29, detachable. The friction-plates 11 11 are held together with some tension by bolts 36, passing through lugs 36′ and provided with springs 37 and wedge-keys 38.

To control the draft-rigging by motion of the truck-bolster, I employ centering-rods 32, connected pivotally at the rear end to the truck-bolster by pins 32′ and also connected by pins 33ª with the draft-rigging at the draw-bar shank or at some other point in the rear thereof. The centering-rods 32 have telescopically-united sections, with springs 33, Fig. 4, which permit some longitudinal extension or contraction of the rods.

34 34 are buffing-rods which extend from the castings 17 or from some other suitable connection with the body-bolster to a washer-plate 35 on the end sill. Similar rods 34′ extend from the casting 17 back to the like casting on the other body-bolster of the car, and rods extend from that body-bolster to its adjacent end sill, the purpose being that buffing strains which are transmitted to the body-bolster and castings 17 by the draft-rigging are transmitted by the rods 34 to the end sill of the car, while pulling strains are divided by the rods 34 and 34′ between the body-bolsters and end sills.

The operation is as follows: When the car is passing around a curve and its body assumes a position oblique to the trucks on which it is carried, the draft-riggings at the meeting ends of the cars will not be cramped thereby, but will swing laterally on the curved segments 16, so that each of the two connected draw-bars will extend without lateral strain in a single longitudinal line, connecting the centers of the trucks. The draft-rigging will always be controlled by and will accommodate itself to the position of the truck because of the centering action of the rods 32, which, being connected with the truck-bolster, hold the draft-rigging at right angles to the truck when the coupler is not connected with another car and enable the car to couple freely either on a straight or curved track. During either draft or buffing the slide-bars 12, being attached to the yoke 10, will move with the draw-bar and will bend the toggle-links 14 slightly; but this motion of the toggle-links will draw the friction-plates 11 with a parallel movement toward each other, clamping them frictionally upon the yoke 10 and the head 15, thus taking up or absorbing the strain, the degree of the clamping force varying directly with the pulling or buffing force exerted upon the draw-bar. This clamping friction of the parts, together with the compression of the springs and rubber blocks and air-cushion, renders the device very efficient.

I derive certain advantages from combining the spring with the rubber blocks and the air-cushion, for during buffing or pulling the strain will first be taken up by the spring and air-cushion and then by the rubber blocks. In this way the action of the device is graduated and is accommodated to the force of the blow which is being absorbed. The spring and rubber blocks also coöperate with the friction-plates in taking up all strains.

Instead of transmitting the strains of draft and buffing to draft-timbers through the lateral bolts, which have heretofore been used in great number on each draft-rigging, the strains of draft and buffing in my device are transmitted endwise to the body-bolster of the car in line with the shank of the draw-bar and thence to the end sills. The buffing strain is thus transmitted by a direct endwise compression of the draft-rigging and not through intermediate lateral bolts. The device is thereby simplified and in service is made strong and durable. The parts are easy to assemble, they can be dismantled for repair quickly, and the construction is otherwise advantageous. To remove the draft-rigging, it is only necessary to take off the lower segment-bar, disconnect the carry-irons, and drop the draft-rigging and draw-bar as a unit.

In Figs. 12 and 13 I show a modification of my invention in which I dispense with the slide-bars 12 and employ simple levers instead of joined or toggle levers to connect the friction-plates 11, and instead of using pivoted bars, such as the bars 32, for centering the draft-rigging with relation to the truck I employ fixed centering-bars $32^a$, constituting a frame which is bolted to the truck-bolster 5 and is connected by pin-and-socket connection to the head 15, so as to maintain the part 15 and the remainder of the draft-rigging always in fixed relation to the truck-bolster. By dispensing with the slide-bars 12 the friction-plates 11 11 of this modification are made to contact with each other at their edges, and they are connected with each other by links $14^a$. The upper friction-plate 11 is secured to the yoke 10 by studs 11′, formed on the friction-plate, entering sockets $11^a$ on the yoke. The lower friction-plate 11 is connected in like manner by studs $11^b$ to the head 15. The other parts of the device are or may be of substantially the same construction as shown in Fig. 11. During buffing or pulling the longitudinal motion of the yoke 10 by moving the upper friction-plate 11 will deflect the links $14^a$ somewhat from a vertical position and will thus bring about a clamping together of the friction-plates upon the yoke and upon each other. The greater the force of buffing or pulling the greater will be the frictional resistance exerted by the friction-plates.

Within the scope of my invention as defined in the claims changes may be made in the form and construction of my apparatus. Parts of it may be used separately or in combination with the elements of other types of draft-rigging. Thus the laterally-swinging draft-rigging mounted on the segment-bars and the same combined with guiding-rods may have the spring mechanism very differently constructed from the arrangement shown in the drawings, and the buffing-rods may be used with draft-riggings of other types in which like advantages of transmitting and distributing both the buffing and pulling strains may be realized.

I claim—

1. In combination with a curved segment connected with a frame of the car, a draft-rigging mounted on the segment and arranged to move laterally, a connection extending from the draft-rigging to the truck, and spring mechanism carried by the draft-rigging in advance of the segment, and arranged to move laterally with the draft-rigging; substantially as described.

2. In combination with a draft-rigging, a curved bearing connected in advance of the body-bolster with the frame of the car, on which the draft-rigging can move laterally, and a piece interposed between the draft-rigging and bolster and adapted to constitute a backing for the draft-rigging and to transmit the strain to the bolster; substantially as described.

3. In combination with a draft-rigging having a draw-bar adapted to receive both buffing and pulling forces, a bearing on which the draft-rigging can swing laterally, said draft-rigging being backed by a part of the car-frame and adapted to transmit strains thereto; substantially as described.

4. In combination with a draft-rigging, a curved segment on which the draft-rigging can move laterally, and to which strains of draft and buffing are transmitted, and a frame to which the segment is connected, said frame being fixed to the car-sills and backed by the bolster; substantially as described.

5. A draft-rigging having longitudinally-sliding friction-plates, a slide-bar connected with the draw-bar, and a connection between the slide-bar, and the said friction-plates adapted to draw them together when the draw-bar is moved lengthwise; substantially as described.

6. A draft-rigging comprising a draw-bar adapted to receive and transmit the force of buffing and draft, said draft-rigging being pivotally mounted on the body of the car, arranged to swing laterally and abutting at its rear end in line with the shank of the draw-bar against a part of the car, and rods connecting said part with the end sill of the car; substantially as described.

7. A draft-rigging comprising a draw-bar adapted to receive and transmit the force of buffing and draft, said draft-rigging abutting at its rear end in line with the shank of the draw-bar against a part of the car and connected therewith to transmit thereto both the buffing and draft, rods connecting said part with the end sill of the car, and rods also connecting the same with a corresponding part at the other end of the car; substantially as described.

8. A laterally-swinging draft-rigging pivotally mounted on a curved segment on the body of the car, said draft-rigging comprising a draw-bar, and spring mechanism applied directly to the end of the draw-bar in advance of said segment, and arranged to move with the draw-bar in its lateral motions; substantially as described.

9. The combination with a laterally-movable draft-rigging, of a curved segment, and a head for the draft-rigging through which the segment passes, and which is adapted to move thereon; substantially as described.

10. The combination with a laterally-movable draft-rigging, of a curved segment 16, a head 15, a frame 17, and a wedge 18 interposed between the parts 15 and 17; substantially as described.

11. The combination with a laterally-movable draft-rigging, of a curved segment 16, a head 15, a frame 17, and the body-bolster, the said segment passing through the part 15; substantially as described.

12. A laterally-swinging draft-rigging pivotally supported by the body of the car and having a guiding connection with the truck, said draft-rigging comprising a pivoted head, a draw-bar, and a yoke extending rearwardly from the draw-bar and arranged to slide therewith in its longitudinal motions, and spring mechanism in advance of the pivotal connection contained by the yoke and moved with the yoke and head in the lateral movements of the draw-bar; substantially as described.

13. A draft-rigging having a longitudinally-movable draw-bar, a laterally-movable friction-plate and a lever connected with and actuated by motion of the draw-bar, and connected also with the movable friction-plate, and adapted to exert pressure thereupon when the draw-bar is moved lengthwise; substantially as described.

In testimony whereof I have hereunto set my hand.

HARRY T. KRAKAU.

Witnesses:
HENRY F. POPE,
HARRY E. ORR.